(12) United States Patent  
Madhani et al.

(10) Patent No.: US 9,693,050 B1  
(45) Date of Patent: Jun. 27, 2017

(54) AUTOMATED MEASUREMENT OF MOBILE DEVICE APPLICATION PERFORMANCE

(71) Applicant: FMR LLC, Boston, MA (US)

(72) Inventors: Sunil Madhani, Cary, NC (US); Bahram Omidfar, Summit, WI (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/169,358

(22) Filed: May 31, 2016

(51) Int. Cl.
| | | |
|---|---|---|
| *G06K 9/00* | (2006.01) | |
| *H04N 17/00* | (2006.01) | |
| *G06T 7/00* | (2017.01) | |
| *G06F 1/16* | (2006.01) | |
| *G06T 3/60* | (2006.01) | |
| *H04B 1/034* | (2006.01) | |

(52) U.S. Cl.
CPC ......... *H04N 17/004* (2013.01); *G06F 1/1637* (2013.01); *G06T 3/60* (2013.01); *G06T 7/001* (2013.01)

(58) Field of Classification Search
CPC .......... G06F 3/00; H04W 24/00; H04L 29/00; H04N 1/00
USPC ................... 382/100; 455/425, 95
See application file for complete search history.

(56) References Cited

U.S. PATENT DOCUMENTS

| | | | |
|---|---|---|---|
| 6,441,828 B1 | 8/2002 | Oba et al. | |
| 6,983,067 B2* | 1/2006 | Cox | G09G 3/006 |
| | | | 324/760.01 |
| 7,113,880 B1* | 9/2006 | Rhea | G09G 3/006 |
| | | | 345/419 |
| 2008/0012856 A1* | 1/2008 | Yu | G06T 7/0012 |
| | | | 345/424 |
| 2008/0207198 A1 | 8/2008 | Juric | |
| 2011/0320879 A1 | 12/2011 | Singh et al. | |
| 2015/0143495 A1* | 5/2015 | Okada | G06F 21/31 |
| | | | 726/7 |

* cited by examiner

*Primary Examiner* — Abolfazl Tabatabai  
(74) *Attorney, Agent, or Firm* — Proskauer Rose LLP

(57) ABSTRACT

Methods, systems and apparatuses, including computer program products, are described for determining a performance metric of a mobile computing device application. A test computing device captures a plurality of images displayed on a mobile computing device based on execution of a mobile computing device application. The test computing device determines a first property for first and second images of the plurality of images. A first performance parameter is set based on a difference between the first properties of the first and second images. The test computing device determines a first property for third and fourth images of the plurality of images. A second performance parameter is set based on a difference between the first properties of the third and fourth image. A performance metric is determined based on a difference between the first performance parameter and the second performance parameter.

28 Claims, 6 Drawing Sheets

400

405 capture a plurality of images displayed on a mobile computing device based on execution of a mobile computing device application

410 determine a first property of a first image of the plurality of images and a first property of a second image of the plurality of images

415 set a first performance parameter based on a difference between the first property of the first image and the first property of the second image

420 determine a first property of a third image of the plurality of images and a first property of a fourth image of the plurality of images

425 set a second performance parameter based on a difference between the first property of the third image and the first property of the fourth image

430 determine a performance metric based on a difference between the first performance parameter and the second performance parameter

FIG. 4

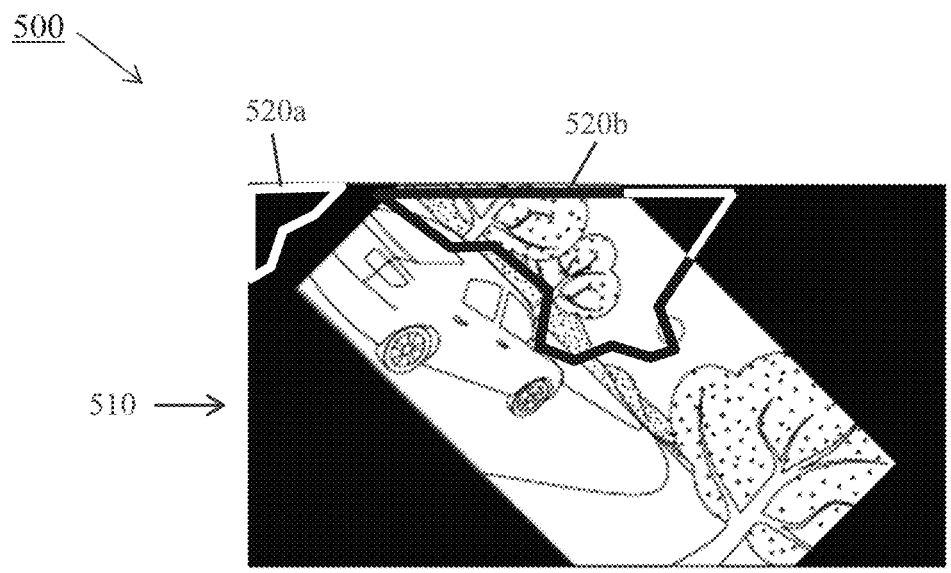
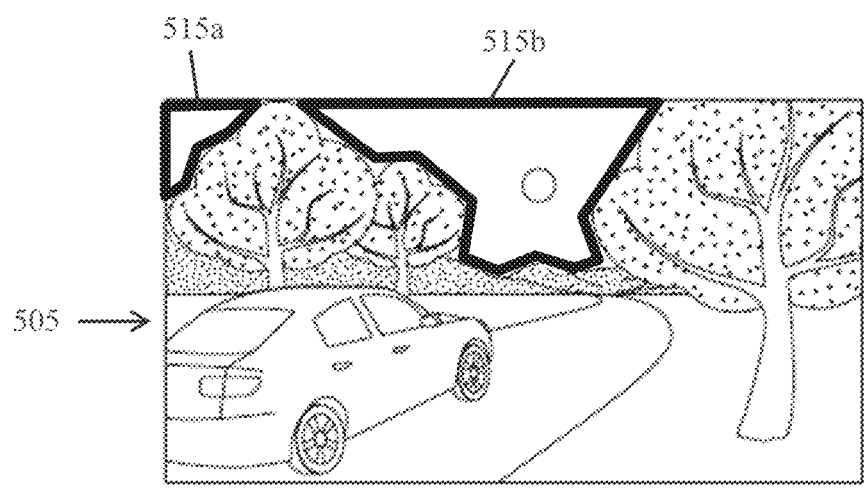
FIG. 5

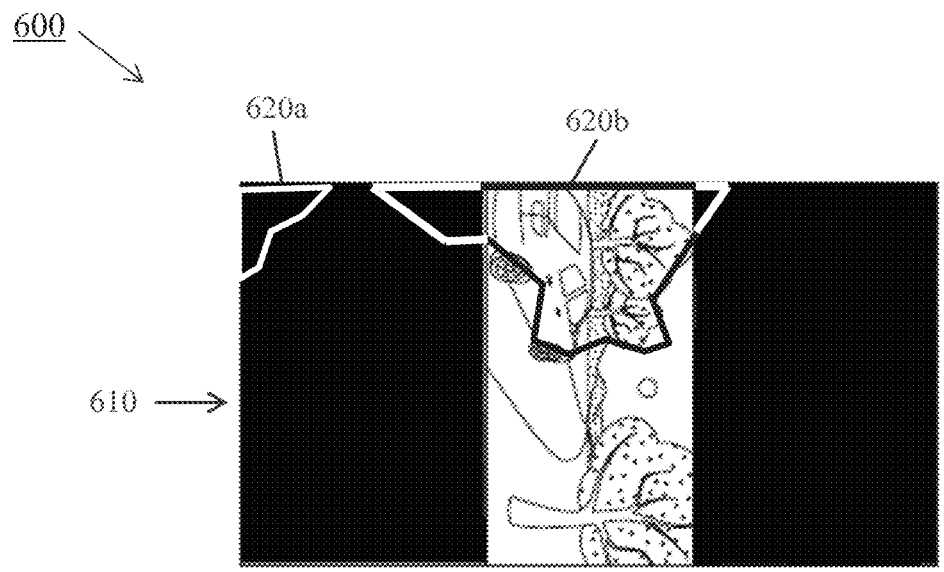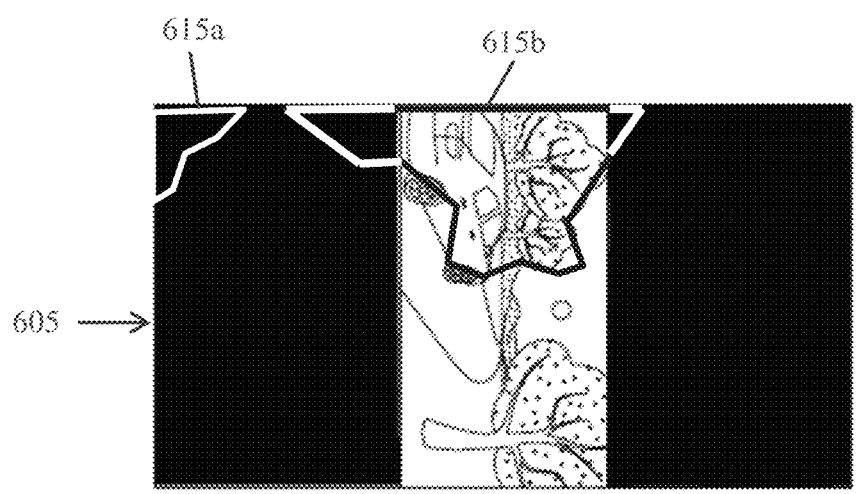
FIG. 6

AUTOMATED MEASUREMENT OF MOBILE DEVICE APPLICATION PERFORMANCE

TECHNICAL FIELD

This application relates generally to systems, methods and apparatuses, including computer program products, for automated quality assurance testing of mobile computing device applications, and determining a performance metric of a mobile computing device application.

BACKGROUND

Many mobile computing devices, such as tablets and smartphones, include one or more sensors for detecting when the orientation of the mobile computing device changes (e.g., from a landscape to a portrait orientation). In response to output from these sensors indicating an orientation change, mobile computing device applications may rotate the image displayed on the mobile computing device to match the orientation of the housing in order to provide a fluid, enjoyable user experience.

Some applications may also modify elements of the displayed image according to its current orientation. Rotating the displayed image can be processor intensive due to the calculations that must be carried out for resizing, repositioning, and re-rendering the various display elements. These intensive calculations can cause a delay that disrupts or hinders the fluidity of the user experience. As a result, developers of mobile computing device applications must exhaustively test their applications to verify performance in the event an orientation change occurs. However, existing quality assurance test systems and methods are incapable of testing a mobile computing device in multiple orientations, or require a large amount of human interaction to manually operate a test jig for rotating the mobile computing device between orientations. Further, current quality assurance test systems and methods require a test operator to manually review video or images of the display to determine mobile computing device application performance during an orientation change. Accordingly, the current process is time-consuming and prone to human error.

SUMMARY

Accordingly, there is a need for improved systems, methods and apparatuses for automated quality assurance testing of mobile computing device applications, and determining a performance metric of a mobile computing device application.

The invention, in one aspect, features a computerized method for determining a performance metric of a mobile computing device application. A test computing device captures a plurality of images displayed on a mobile computing device based on execution of a mobile computing device application. The test computing device determines a first property of a first image of the plurality of images and a first property of a second image of the plurality of images. The test computing device sets a first performance parameter based on a difference between the first property of the first image and the first property of the second image. The test computing device determines a first property of a third image of the plurality of images and a first property of a fourth image of the plurality of images. The test computing device sets a second performance parameter based on a difference between the first property of the third image and the first property of the fourth image. The test computing device determines a performance metric based on a difference between the first performance parameter and the second performance parameter.

The invention, in another aspect, features an automated test system for automated quality assurance testing of a mobile computing device application. The system includes a test computing device including a capture device, and a moveable support member in communication with the test computing device. The system further includes a mobile computing device having a display. The mobile computing device is coupled to the moveable support member in a first orientation. The moveable support member is capable of rotating the mobile computing device between the first orientation and a second orientation. The test computing device is programmed to capture a plurality of images displayed on a mobile computing device based on execution of a mobile computing device application. The test computing device is further programmed to determine a first property of a first image of the plurality of images and a first property of a second image of the plurality of images. The test computing device is further programmed to set a first performance parameter based on a difference between the first property of the first image and the first property of the second image. The test computing device is further programmed to determine a first property of a third image of the plurality of images and a first property of a fourth image of the plurality of images. The test computing device is further programmed to set a second performance parameter based on a difference between the first property of the third image and the first property of the fourth image. The test computing device is further programmed to determine a performance metric based on a difference between the first performance parameter and the second performance parameter.

The invention, in another aspect, features a computer program product, tangibly embodied in a non-transitory computer readable storage device, for determining a performance metric of a mobile computing device application. The computer program product includes instructions operable to cause a test computing device to capture a plurality of images displayed on a mobile computing device based on execution of a mobile computing device application. The computer program product includes instructions operable to cause the test computing device to determine a first property of a first image of the plurality of images and a first property of a second image of the plurality of images. The computer program product includes instructions operable to cause the test computing device to set a first performance parameter based on a difference between the first property of the first image and the first property of the second image. The computer program product includes instructions operable to cause the test computing device to determine a first property of a third image of the plurality of images and a first property of a fourth image of the plurality of images. The computer program product includes instructions operable to cause the test computing device to set a second performance parameter based on a difference between the first property of the third image and the first property of the fourth image. The computer program product includes instructions operable to cause the test computing device to determine a performance metric based on a difference between the first performance parameter and the second performance parameter.

Any of the above aspects can include one or more of the following features. In some embodiments, determining the first property of the first image includes computing a first luminance value based on a plurality of pixels of the first image, and determining the first property of the second image includes a second luminance value based on a plurality of pixels of the second image. In some embodiments, setting the first performance parameter based on the difference between the first property of the first image and the first property of the second image includes determining, by the test computing device, the difference between the first property of the first image and the first property of the second image exceeds a first predetermined threshold, and setting, by the test computing device, the first performance parameter based on a time the first image was displayed on the mobile computing device.

In some embodiments determining the first property of the third image includes computing a third luminance value based on a plurality of pixels of the third image, and determining the first property of the fourth image includes computing a fourth luminance value based on a plurality of pixels of the fourth image. In some embodiments, setting the second performance parameter based on the difference between the first property of the third image and the first property of the fourth image includes determining, by the test computing device, the first property of the third image and the first property of the fourth image are substantially equal, and setting, by the test computing device, the second performance parameter based on a time the third image was displayed on the mobile computing device.

In some embodiments, determining the first property of the first image and the first property of the second image includes: computing, by the test computing device, a pixel luminance value for each pixel of the first image; creating, by the test computing device, a first set of pixels including pixels of the first image having a predetermined range of pixel luminance values, where the first set of pixels comprises a predetermined number of pixels of the first image; computing, by the test computing device, a first luminance value based on a mean of the pixel luminance values of the pixels of the first set of pixels; creating, by the test computing device, a second set of pixels comprising pixels of the second image, where each pixel of the second set of pixels has a position corresponding to a position of a pixel of the first set of pixels; computing, by the test computing device, a pixel luminance value for each pixel of the second set of pixels; and computing, by the test computing device, a second luminance value based on a mean of the pixel luminance values of the pixels of the second set of pixels.

In some embodiments, determining the first property of the third image of the plurality of images and the first property of the fourth image of the plurality of images includes: creating, by the test computing device, a third set of pixels including pixels of the third image, wherein each pixel of the third set of pixels has a position corresponding to a position of a pixel of the first set of pixels; computing, by the test computing device, a pixel luminance value for each pixel of the third set of pixels; computing, by the test computing device, a third luminance value based on a mean of the pixel luminance values of the pixels of the third set of pixels; creating, by the test computing device, a fourth set of pixels comprising pixels of the fourth image, where each pixel of the fourth set of pixels has a position corresponding to a position of a pixel of the first set of pixels; computing, by the test computing device, a pixel luminance value for each pixel of the fourth set of pixels; and computing, by the test computing device, a fourth luminance value based on a mean of the pixel luminance values of the pixels of the fourth set of pixel.

In some embodiments, the third image and the fourth image are captured consecutively in time by the test computing device. In some embodiments, the first set of pixels includes between fifteen and thirty percent of a total number of pixels of the first image.

In some embodiments, the plurality of images displayed on the mobile computing device includes a video of an image displayed the mobile computing device changing from a first orientation to a second orientation during the first predetermined period of time.

In some embodiments, capturing the plurality of images displayed on the mobile computing device further includes capturing, by test computing device, a video of a reflection of the mobile computing device on a reflective element for a predetermined period of time, and extracting, by the test computing device, the plurality of images from the captured video. The plurality of images shows the reflection of the mobile computing device display at predetermined intervals during the predetermined period of time. In some embodiments, the plurality of images are extracted from the captured video at a rate of substantially sixty images per second.

In some embodiments, the performance metric comprises a duration of time for an image displayed on the mobile computing device to change from the first orientation to the second orientation. In some embodiments, the pixel luminance for each pixel of the first image is based on a weighted sum of a plurality of pixel color component intensity values of each pixel.

In some embodiments, the plurality of images displayed on the mobile computing device are captured in response to a first command transmitted by the mobile computing device executing a test script received from a remote computing device. The mobile computing device changes from a first orientation to a second orientation based on a second command transmitted to a moveable support member coupled to the mobile computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a flow diagram of a method for determining a performance metric of a mobile computing device application.

FIG. 5 is a diagram showing a first image and a second image, in accordance with the invention.

FIG. 6 is a diagram showing a third image and a fourth image, in accordance with the invention.

DETAILED DESCRIPTION

Figure 1:
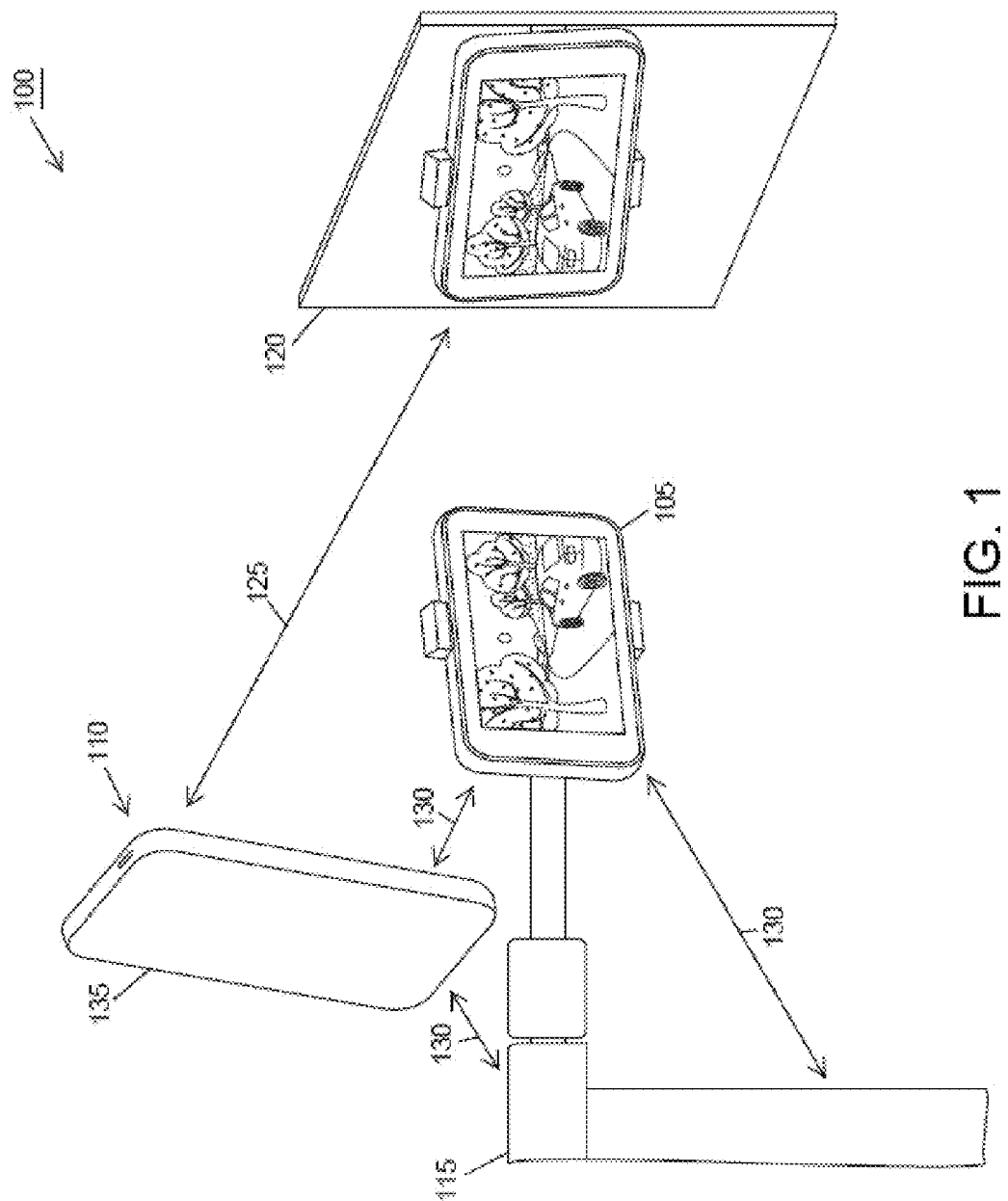
FIG. 1 is a block diagram of an exemplary system showing the mobile computing device in a first orientation, in accordance with the invention.

FIG. 1 is a block diagram of a system 100 in accordance with embodiments of the invention described herein. System 100 includes mobile computing device 105 coupled to arm 115. Arm 115 can be a moveable support member (e.g., automated mechanical arm, robotic arm) having one or more joints capable of motion (e.g., rotational motion, linear motion). In some embodiments, arm 115 is capable of positioning mobile computing device 105 in a first orientation (e.g., landscape orientation), and rotating mobile computing device 105 substantially ninety degrees about an axis of rotation such that mobile computing device 105 is positioned in a second orientation (e.g., portrait orientation). In some examples, arm 115 can be operated to alternate the position of mobile computing device 105 between the first and second orientations. In some examples, arm 115 can rotate mobile computing device 105 substantially 360 degrees about an axis of rotation.

Mobile computing device 105 can be coupled to arm 115 via a gripper or holder having features to engage the housing of mobile computing device 105. For example, mobile computing device 105 can be coupled to arm 115 using one or more of an adjustable vise, a spring clamp, a hydraulic clamp, a magnetic mount, a suction cup, and a vacuum.

Examples of mobile computing device 105 include tablet computers, smartphones, and other mobile computing devices known in the art.

Figure 2:
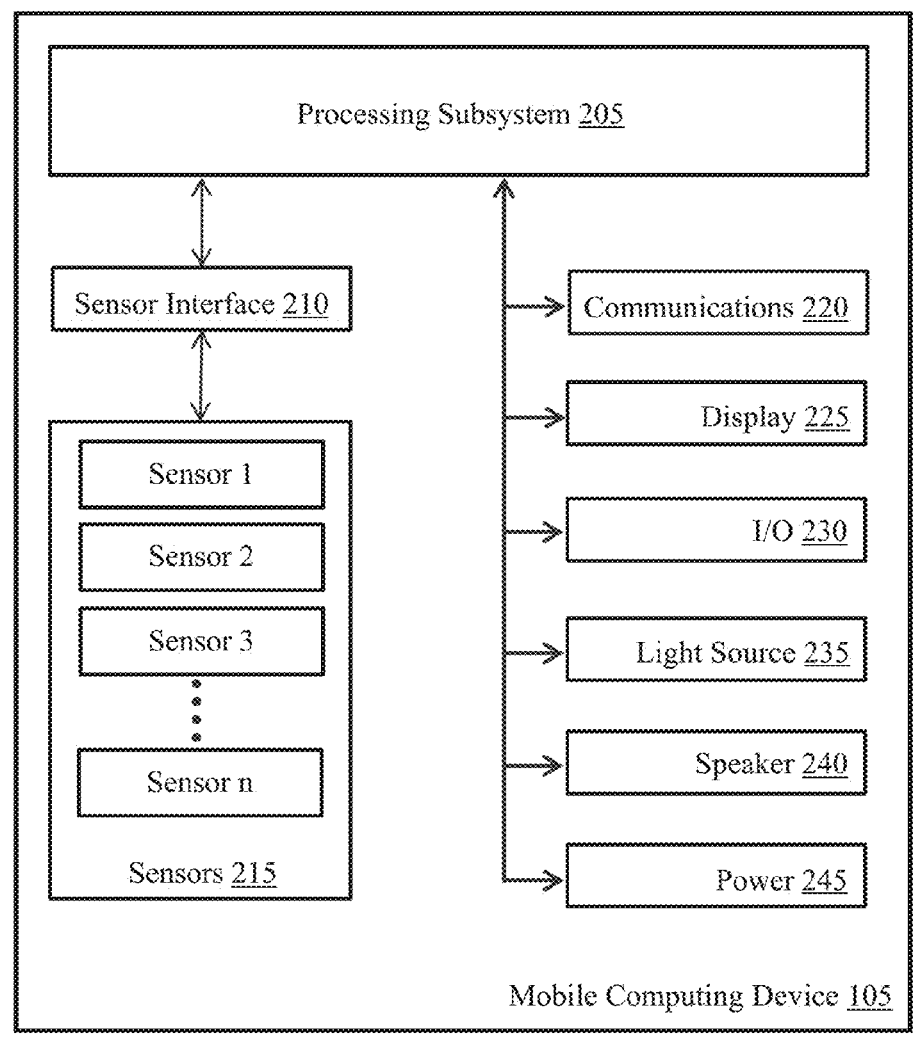
FIG. 2 is a block diagram of an exemplary mobile computing device, in accordance with the invention.

FIG. 2 is a block diagram 200 of an exemplary embodiment of mobile computing device 105. Mobile computing device 105 includes processing subsystem 205 in communication with sensor interface 210 for accessing a variety of sensors 215. Processing subsystem 205 generally includes a processor, volatile and non-volatile memory, and other logic for managing and interfacing with other components of mobile computing device 105. Processing subsystem 205 is programmed with computer software instructions enabling it to perform computations and operations for executing mobile computing device applications and test scripts as described herein in conjunction with the other components of mobile computing device 105. Sensor interface 210 includes circuitry to facilitate access to sensors 215. In some embodiments, sensor interface 210 includes a co-processor in communication with one or more of sensors 215 for collecting and processing sensor data from sensors 215.

Sensors 215 can include a plurality of sensors for detecting and/or measuring properties of mobile computing device 105 and its location, and providing corresponding output (e.g., electrical signal, optical signal). For example, sensors 215 can include sensors responsive to changes in the altitude of mobile computing device 105 (e.g., barometric pressure sensor, pressure altimeter, barometric altimeter). Sensors 215 can also include sensors responsive to a change in moisture content in the atmosphere (e.g., hygrometer), and sensors responsive to changes in the strength of a magnetic field (e.g., magnetometer, teslameter, gaussmeter). Sensors 215 can further include sensors responsive to changes in properties of sound (e.g., microphone, sound transducer) such as changes in the amplitude, tone, pitch, and/or duration of sound. In some examples, sensors 215 include sensors responsive to changes in properties of light (e.g. ambient light sensor, photodetector, phototransistor) such as changes in intensity and wavelength.

In some embodiments, sensors 215 includes sensors responsive to a change in linear acceleration (e.g., accelerometer) and angular velocity (e.g., gyroscope), and the output from the sensors comprises signals or data corresponding to a single axis or a plurality of axes (e.g., 2-axis sensor, 3-axis sensor).

Sensors 215 can further include other sensors such as an image sensor (e.g., camera), temperature sensor (e.g., thermometer), and biometric sensor (e.g., fingerprint reader). In some embodiments, mobile computing device 105 includes a plurality of a given sensor type for making multi-channel "diversity" measurements of certain properties.

Processing subsystem 205 is further in communication with several other components and subsystems of mobile computing device 105 such as communications 220, display 225, I/O 230, light source 235, speaker 240, and power 245. Although the example in FIG. 2 shows a shared connection between processing subsystem 205 and all of the other components and subsystems of mobile computing device 105, it should be understood that any number of connections or interfaces can be used to connect processing subsystem 205 to the other components and subsystems of mobile computing device 105.

Communications 220 includes circuitry to facilitate communications between mobile computing device 105 and other computing and peripheral devices using various protocols over various transmission mediums. For example, communications 220 can include circuitry for communicating using wireless technology (e.g., Wi-Fi, cellular, GPS, Bluetooth) and wired technology (e.g., wired Ethernet, USB, optical, Lightning, FireWire). Display 225 can include a flat panel display or screen (e.g., LCD display, OLED display) and associated circuitry for controlling the display of images on the display. In some embodiments, display 225 further includes a touch panel or touchscreen display as an input device to mobile computing device 105.

I/O 230 can include circuitry corresponding to one or more components for providing input to mobile computing device 105 (e.g., button, slider, switch), and providing output or feedback from mobile computing device 105 (e.g., audio signal output, video signal output, vibration circuit). Light source 235 can include one or more solid-state light sources (e.g., LED, OLED, PLED). In some embodiments, light source 235 includes components for enhancing or directing light from the solid state light source (e.g., reflector, lens, diffuser, light guide, light pipe) and/or circuitry for controlling the operation of light source 235. Speaker 240 can include one or more sound-producing components (e.g., speakers) and related components for enhancing or directing sound (e.g., resonance chamber, amplifier). Power 245 can include a battery for providing power to the various components of mobile computing device 105. Power 245 can also include circuitry for accepting power provided from a wired power source (e.g., AC/DC adapter, USB port), and charger circuitry for charging the battery.

Returning to FIG. 1, system 100 further includes test computing device 135 and capture device 110 in optical communication with reflective element 120 via optical path 125. Capture device 110 can include a camera or image sensor and corresponding circuitry for capturing video and/or images. In some embodiments, capture device 110 is a component of test computing device 135. In some embodiments, capture device 110 and test computing device 135 are devices having a substantially similar architecture to mobile computing device 105. In some embodiments, capture device 110 stores and processes captured video according to the methods described herein. In some embodiments, capture device 110 is a digital camera coupled to a test computing device that communicates captured digital videos and images to the test computing device via a wired or wireless communications protocol. In some embodiments, test computing device 135 is a standalone computing device in communication with the components of system 100.

Reflective element 120 can be any element having a reflective surface capable of producing a reflected image of an object placed in front of it. In some examples, reflective element 120 is a mirror. In some examples reflective element 120 includes a glass or other planar substrate coated with one or more metals and/or paint. In some embodiments, reflective element 120 is shaped as a square having sides at least as long as the longest side of mobile computing device 105.

As shown in FIG. 1, reflective element 120 can be positioned in front of mobile computing device 105 such that a reflected image of mobile computing device 105 is formed by reflective element 120. For example, mobile computing device 105 can be coupled to arm 115 in a landscape orientation with its display facing reflective element 120, and substantially parallel to it. In some embodiments, mobile computing device 105 can be coupled to arm 115 with its display facing reflective element 120 at an acute angle.

Capture device 110 can be positioned adjacent to or behind and offset from mobile computing device 105 such that an image sensor of capture device 110 is in optical communication with the reflected image of mobile computing device 105 in reflective element 120. In the example shown in FIG. 1, capture device 110 is positioned behind and above mobile computing device 105, creating optical path 125 between the image sensor of capture device 110 and the image of mobile computing device 105 reflected in reflective element 120. However, it should be understood that capture device 110 can be positioned at other locations with respect to mobile computing device 105 without departing from the scope of the technology. In some embodiments, capture device 110 and/or test computing device 135 are coupled to an automated mechanical arm substantially similar to arm 115. In some embodiments, capture device 110 and/or test computing device 135 are coupled to a stationary mechanical arm or bracket.

In some embodiments, the components of system 100 described above are mounted within a housing or enclosure.

In various embodiments of the invention, the components of system 100 can communicate using one or more wired or wireless communications protocols. (Communications between the components of system 100 are represented generally by communications paths 130.) For example, mobile computing device 105, test computing device 135, capture device 110 and arm 115 can be connected to a local network, such as a LAN, or a wide area network ("WAN"), such as the Internet and/or a cellular network, or alternatively, a network comprising components of both a LAN and a WAN, or any other type of network known in the art. In some embodiments, two or more components of system 100 are in communication using near field communications. In some examples, one or more of mobile computing device 105, test computing device 135, and capture device 110 receive power from and communicate over a cable connected to a wired interface connector (e.g., lightning, USB OTG, USB Type-C, PDMI, custom/proprietary dock connector).

The components of system 100 can further be in network communication with a remote computing device (not shown), and the remote computing device can perform various operations related to the methods described herein. In some embodiments, the remote computing device can transmit test scripts to mobile computing device 105 and commands to cause mobile computing device 105 to execute a test script. In some embodiments, the remote computing device can further control test computing device 135, capture device 110, and/or arm 115 using commands that are communicated over a network.

In some examples, mobile device 105 can communicate directly with arm 115 over a wired or wireless interface. For example, mobile device 105 can send commands to arm 115 to cause arm 115 to perform a movement (e.g., rotate mobile device 105 about an axis of rotation) to change the orientation of mobile device 105. In some embodiments, mobile device 105 transmits commands for arm 115 to a computing device connected to arm 115. In some examples, capture device 110 or test computing device 135 can control arm 115 in a substantially similar manner as described above with respect to mobile computing device 105. In some embodiments, mobile computing device 105, test computing device 135, and capture device 110 can communicate directly or over a network for performing various steps of the methods described herein.

As shown in FIG. 1, mobile computing device 105 can display an image in landscape orientation when mobile computing device 105 is positioned in a landscape orientation. In some embodiments, the image shown on the display of mobile computing device 105 can be presented based on the execution of an application on mobile computing device 105. In some embodiments, the application running on mobile computing device 105 can use output from one or more of sensors 215 (e.g., gyroscope, accelerometer) to determine that mobile computing device 105 device has been rotated from landscape to portrait orientation, and rotate the displayed image accordingly to also be in portrait orientation.

Figure 3:
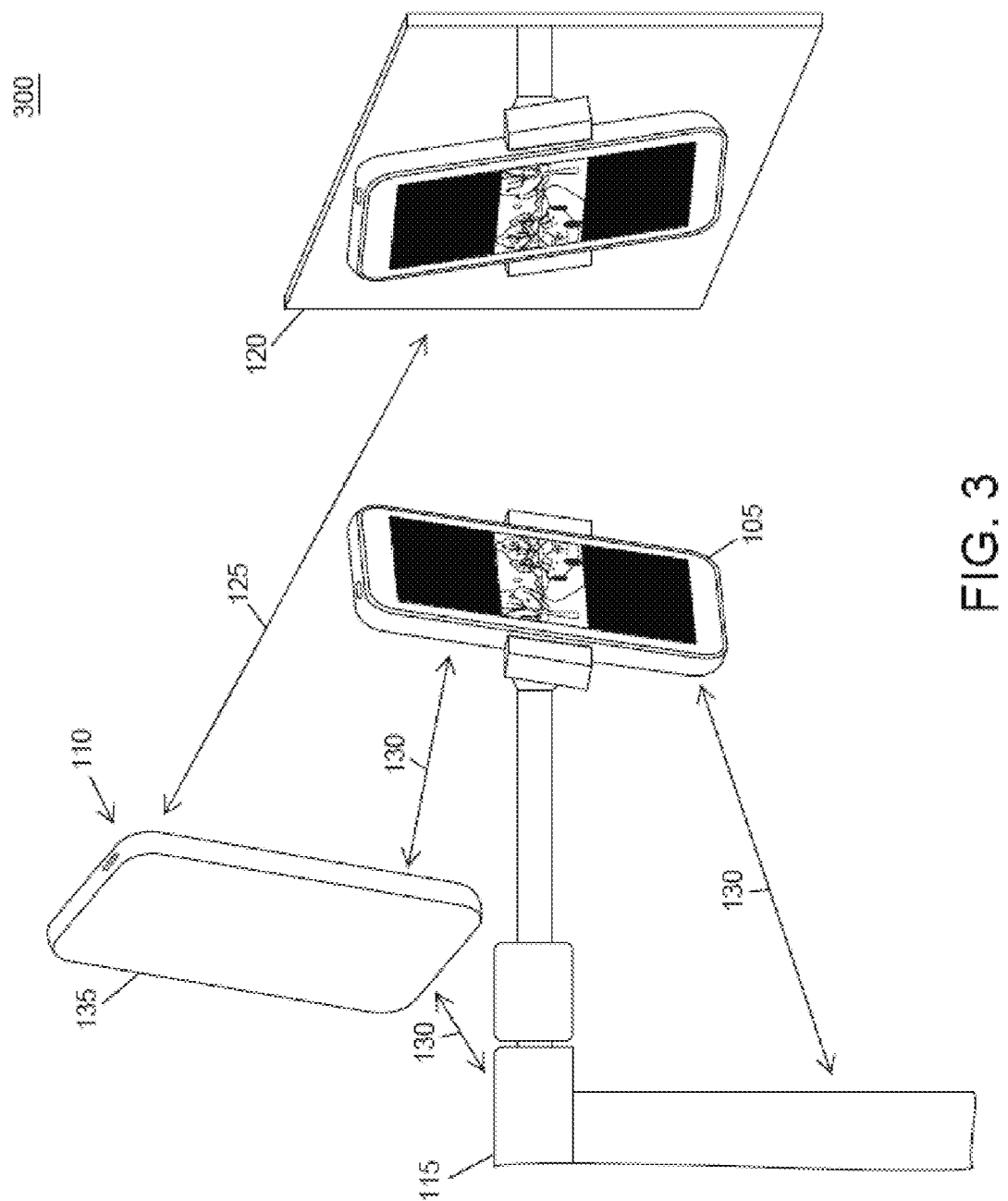
FIG. 3 is a block diagram of an exemplary system showing the mobile computing device in a second orientation, in accordance with the invention.

FIG. 3 is a block diagram 300 showing system 100 in accordance with embodiments of the invention described herein. As shown in FIG. 3, arm 115 has rotated mobile computing device 105 substantially ninety degrees to a second orientation (e.g., portrait orientation), and the image displayed on mobile computing device 105 has also been rotated from landscape to portrait orientation.

Although the image shown in the examples discussed herein is a picture or photograph, it should be understood that mobile computing device 105 can display any number of image types based on images generated and presented by an application executing on mobile computing device 105. In some examples, mobile computing device 105 displays a graphical user interface, and in response to a change in the orientation of mobile computing device 105, one or more elements of the graphical user interface change. In some embodiments, the images presented by an application in portrait and landscape orientation include elements that differ by one or more of font size, font style, field length, number of input fields displayed, color, and shape.

As described above, mobile computing device 105 can execute a mobile computing device application that rotates the image displayed on mobile computing device 105 from landscape to portrait orientation, or vice versa, in response to mobile computing device 105 itself being rotated. However, for mobile computing device applications that also modify elements of the displayed image according to orientation, rotating the displayed image can be processor intensive due to the calculations that must be carried out for resizing, repositioning, and re-rendering the various display elements. This can cause a delay in the operation of the mobile computing device application that negatively impacts user experience. The speed with which a mobile computing device can rotate and update images displayed on its screen can be used as a metric for gauging performance of mobile computing device applications. Accordingly, systems, methods and apparatuses described herein can be used for automated quality assurance testing of a mobile computing device application, and in particular, for determining a performance metric of a mobile computing device application.

FIG. 4 is a flow diagram of a method 400 for determining a performance metric of a mobile computing device application, using the system 100 shown in FIG. 1 and FIG. 3. Mobile computing device 105 can be mounted to arm 115 in a first orientation (e.g., landscape orientation), with its display facing reflective element 120. In some embodiments, mobile computing device 105 can execute a mobile computing device application and test script that have been preloaded on mobile computing device 105. In some embodiments, a remote computing device can load a mobile computing device application and/or test script to mobile computing device 105 and cause mobile computing device 105 to begin executing the application and test script.

Test computing device 135 can capture (405) a plurality of images displayed on a mobile computing device based on execution of a mobile computing device application. Upon execution of a test script loaded as described above, mobile computing device 105 can transmit a command to test computing device 135 causing capture device 110 to begin capturing a plurality of images (e.g., video) of the reflection of mobile computing device 105 in reflective element 120.

Further, in response to execution of the test script, mobile computing device 105 can transmit a command to arm 115 causing arm 115 to rotate mobile computing device 105 substantially ninety degrees about an axis of rotation such that mobile computing device 105 is positioned in a second orientation (e.g., portrait orientation).

Capture device 110 continues to capture video of the reflection of mobile computing device 105 in reflective element 120 throughout and after the time that arm 115 rotates mobile computing device 105 and the mobile computing device application executing on mobile computing device 105 rotates the image displayed on its screen. In some examples, capture device 110 captures video for a predetermined period of time (e.g., 2 seconds, 5 seconds, 10 seconds). In some examples, capture device 110 captures video until mobile computing device 105 transmits a command to computing device 135 causing capture device 110 to stop capturing video.

The captured video can be stored in a memory device local to capture device 110 or test computing device 135. In some embodiments, the captured video is stored on a remote computing device or network attached storage device in network communication with capture device 110 and test computing device 135.

The captured video of the reflection of mobile computing device 105 can be processed to extract a plurality of still images or frames of the images displayed on mobile computing device 105 at predetermined intervals during the capture period of time described above. For example, test computing device 135 can extract a predetermined number of images from the captured video for each second of captured video (e.g., 20 frames per second, 40 frames per second, 60 frames per second, 80 frames per second). In an exemplary embodiment, the captured video is five seconds in length, and test computing device 135 extracts images from the captured video at a rate of 60 frames per second, i.e., one image is extracted from the captured video substantially every 0.0167 seconds. Accordingly, in this example, 300 images of the reflection of mobile computing device 105 in reflective element 120 are extracted from five seconds of captured video.

Test computing device 135 can further process each extracted image to isolate the image displayed on the display of mobile computing device 105. For example, image processing software and algorithms can be used to identify the edges of the mobile computing device 105 display and extract only the displayed image. This process can be facilitated by virtue of the captured images showing a reflection of mobile computing device 105 in reflective element 120. In one aspect, the size and shape of reflective element 120 can aid in the capture of the images. For example, reflective element 120 can be a square having sides substantially as long as the longest side of the mobile computing device 105 housing. Accordingly, the reflection of mobile computing device 105 in reflective element 120 can show a substantially complete view of mobile computing device 105 including its entire housing whether mobile computing device 105 is in landscape or portrait orientation, or in transition between the two orientations.

In another aspect, the captured reflection of mobile computing device 105 in reflective element 120 further facilitates extraction of the images displayed on the mobile computing device 105 display. For example, in the reflected image of mobile computing device 105, image processing software can readily differentiate between the mobile computing device 105 housing and the pixels of its backlit display. Accordingly, the edges of the mobile computing device 105 housing surrounding the display can be used as markers to delimit the boundaries of the display, and an image comprising just the display can be cropped and extracted from each of the images that were first extracted from the captured video of the reflection of mobile computing device 105 in reflective element 120. In some embodiments, software such as Office Lens from Microsoft can be used to process the extracted images. However, it should be understood that other algorithms and techniques known in the art for edge detection and image processing can be used to process the extracted images without departing from the spirit of the invention.

The plurality of extracted images showing mobile computing device 105 transitioning from a first orientation to a second orientation can be tilted or angled with respect to one another. Further, the images of mobile computing device 105 in the first orientation can have a different aspect ratio from the images of mobile computing device 105 in the second orientation. Accordingly, the plurality of extracted images can be processed to normalize the orientation of each image and facilitate comparison between them. In some examples, image processing algorithms and techniques can be used to remap the position of the pixels of the extracted images such that there is substantially a 1:1 correspondence between the positions of the pixels of each extracted image. As an example, the plurality of extracted images can be normalized such that each image is shown in a landscape orientation, and a pixel located in the upper left hand corner of a first image has the same position (e.g., x,y coordinate) as a pixel located in the upper left hand corner of a second image.

After extracting and processing the plurality of images, test computing device 135 can perform various operations to determine when the mobile computing device application begins rotating the image displayed on the mobile computing device display in response to arm 115 rotating mobile computing device 105 from the first orientation to the second orientation. Test computing device 135 can determine (410) a first property of a first image of the plurality of images and a first property of a second image of the plurality of images. In some examples, the first property of the first and second images is a luminance value. Continuing the example described above in which 300 images are extracted from five seconds of captured video, test computing device 135 can compute a luminance value (e.g., brightness value) for the first of the 300 images based on a plurality of the pixels of the first image. In some examples, test computing device 135 computes the luminance of each pixel of the first image and sets the luminance value of the first image based on the mean of all the luminance values calculated for each pixel. A luminance value for a second image that occurred later in time than the first image can be similarly computed.

In some embodiments, the luminance of each pixel can be based on a weighted sum of a plurality of pixel color component intensity values of each pixel. For example, the luminance of each pixel can be determined by multiplying the red, green, and blue components of each pixel by corresponding constants and summing the result. For example, luminance can be determined based on the equation $L=0.2126*R+0.7152*G+0.0722*B$, where L is luminance, and R, G and B are numeric values corresponding to red, green and blue components of a particular pixel.

Based on a comparison of the luminance values calculated for the first image and the second image, test computing device 135 can determine when the image displayed on mobile computing device 105 began rotating. Test computing device 135 can set (415) a first performance parameter based on a difference between the first property of the first image and the first property of the second image. Test computing device 135 can compare the luminance values computed for the first and second images. Upon determining that the difference between the luminance values exceeds a predetermined threshold, test computing device 135 can set a first performance parameter indicating a time when the first image was displayed on mobile computing device 105. In some embodiments, the first performance parameter is a numeric index indicating which image of the 300 captured images the first image is. In an exemplary embodiment, test computing device 135 sets the first performance parameter when the luminance values differ by substantially +/−20%. However, other thresholds for the difference between the luminance values of the first and second images can be used without departing from the spirit of the invention.

In some embodiments, the first image and the second image are images that were captured consecutively in time from the captured video (e.g., the first and second images of the 300 extracted images in the described example). In some embodiments, there can be a delay between the time when capture device 110 begins capturing video and the time when arm 115 begins rotating mobile computing device 105, and the first image is not literally be the first image of the 300 extracted images. For example, if the difference between the luminance values of the first and second images does not exceed the predetermined threshold, test computing device 135 can instead compare the second image to the image that immediately followed it in time. In some embodiments, the first and second images are not consecutive in time. The method can continue in this manner until it is determined that the difference between two images has exceeded the predetermined threshold.

FIG. 5 is a diagram 500 showing first image 505 and second image 510 in accordance with the invention. In the example shown in FIG. 5, first image 505 is the first of the 300 extracted images, and second image 510 is an image extracted a period of time after first image 505 when the image displayed on mobile computing device 105 was in the process of rotating from the first orientation to the second orientation. It can be understood that the luminance computed for first image 505 will be greater in magnitude than the luminance computed for second image 510 which includes substantially more black pixels than first image 505. Therefore, the difference between the luminance values of first image 505 and second image 510 exceeds a predetermined threshold (e.g., +/−20% difference), and the first performance parameter will reflect the time that first image 505 was displayed in the captured video (e.g., a time offset indicating the amount of time that has elapsed from the start of the captured video, a time stamp indicating the actual time the first image was captured). As shown in FIG. 5, the luminance value between first image 505 and second image 510 differs greatly due to second image 510 being approximately halfway through an orientation change. However, the images in FIG. 5 are meant to be exemplary of the operations of the method. It should be understood that the second image can typically be an image showing the display in a much earlier stage of rotation due to its occurrence consecutively in time, or near in time, to the first image.

Upon determining when the mobile computing device application started rotating the image displayed on the mobile computing device display, the method can determine when the rotation of the image completed based on analysis of third and fourth images occurring later in time than the first and second images. Test computing device 135 can determine (420) a first property of a third image of the plurality of images and a first property of a fourth image of the plurality of images. In some examples, the first properties of the third and fourth images are luminance values computed in a substantially similar manner as described above.

Based on a comparison of the luminance values calculated for the third image and the fourth image, test computing device 135 can determine when the image displayed on mobile computing device 105 finished rotating. Test computing device 135 can set (425) a second performance parameter based on a difference between the first property of the third image and the first property of the fourth image. Test computing device 135 can compare the luminance values computed for the third and fourth images. Upon determining that the computed luminance values are substantially equal, test computing device 135 can set a second performance parameter indicating a time when the third image was displayed on mobile computing device 105. In some embodiments, the first performance parameter is a numeric index indicating which image of the 300 captured images the third image is. In an exemplary embodiment, test computing device 135 sets the second performance parameter when the luminance values are substantially equal (e.g., differ by 0%). However, other thresholds for the difference between the luminance values of the third and fourth images (e.g., differ by less than 5%, differ by less than 2%, differ by less than 1%) can be used without departing from the spirit of the invention.

FIG. 6 is a diagram showing third image 605 and fourth image 610, in accordance with the invention. In the example shown in FIG. 6, third image 605 is substantially similar or equal to fourth image 610. It can be understood that the luminance computed for third image 605 will be substantially equal in magnitude to the luminance computed for fourth image 610. Therefore, the second performance parameter will reflect the time that third image 605 was displayed in the captured video.

Test computing device 135 can determine (430) a performance metric based on a difference between the first performance parameter and the second performance parameter. For example, the performance metric can comprise the duration of time it took for an image displayed on the mobile computing device to change from the first orientation to the second orientation. Test computing device 135 can determine the performance metric based on the difference in time between when the first image was displayed (e.g., T1) and the time the third image was displayed (e.g., T2).

Using the example from above, if the first image is the 20$^{th}$ image of the 300 captured images, it indicates that the mobile computing device application began rotating the image displayed on the mobile computing device 105 display at T1=0.0167 seconds per image*20 images=0.334 seconds. If the third image is the 100$^{th}$ image of the 300 captured images, it indicates that the mobile computing device application completed rotating the image displayed on the mobile computing device 105 display at T2=0.0167 seconds per image*100 images=1.67 seconds. Accordingly, the performance metric can be the difference between T1 and T2, e.g., 1.67 seconds−0.334 seconds=1.336 seconds.

In embodiments in which the first and second performance parameters comprise numerical indexes indicating the image numbers of the first and third images, computations can be performed based on the difference in the image numbers to determine a period of time for the performance metric. In one example in which the images are extracted from the video at a rate of 60 frames per second, the first image (e.g., N1) is the fourth of the 300 captured images (e.g., N1=4), and the third image (e.g., N3) is the 130$^{th}$ image of the 300 captured images (e.g., N3=130). For this example, the performance metric can be computed based on the difference between the numeric index of the first and third images, N3−N1=130−4=126. This result can be plugged into an equation to convert the difference to a number of seconds: performance delay in seconds=[(126 div 60)+((126 mod 60)/60)]=[(2)+((6)/60)]=2.1 seconds. In some embodiments, test computing device 135 can add a delay to the performance metric based on a delay between the time arm 115 rotates mobile computing device 105 and the time the mobile computing device application begins rotating the image displayed on the screen.

The performance metric can be an indication of the performance of a mobile computing device application. The computed performance metric can be evaluated based on the particular mobile computing device application to determine optimizations that may be needed to the source code of the mobile computing device application, or limitations of the hardware on which the mobile computing device application is executing.

In some examples, the performance of the method can be optimized. For example, in some embodiments, test computing device 135 can determine the first property of the first image and the first property of the second image based on a subset of the pixels. Test computing device 135 can compute a pixel luminance for each pixel of the first image as described above. However, instead of computing a luminance value based on the mean of all pixel luminance values, the luminance can be computed based on the luminance of a predetermined number of the pixels of the first image, and using pixels having a predetermined range of pixel luminance values. For example, test computing device 135 can create a first set of pixels including 25% of the total pixels, where the pixels in the set have the largest computed pixel luminance values of the pixels of the first image. In some embodiments, the first set of can include pixels that have the smallest computed pixel luminance values of the pixels of the first image. In some embodiments, the first set can include between 15% and 30% of the total number of pixels in the first image.

Test computing device can compute a luminance value for the first image based on the mean of the pixel luminance values calculated for the pixels in the first set. Test computing device 135 can also store position information (e.g., x,y coordinates) about each pixel in the first set.

Referring to FIG. 5, pixels from regions 515a and 515b collectively make up first set of pixels 515 for first image 505. Accordingly, the luminance value computed for first image 505 can be based on the mean of the pixel luminance values calculated for the pixels located within regions 515a and 515b. Although first set of pixels 515 comprises regions 515a and 515b, which are shown as contiguous regions of pixels, it should be understood that first set of pixels 515 can include pixels from any region of first image 505 that are within the range of pixels (e.g., top 25% of pixels with largest luminance values), including individual pixels that are not contiguous with any other pixel of first set of pixels 515.

Test computing device 135 can use the position information about the pixels of the first set of pixels to create a second set of pixels including pixels from the second image. For example, each pixel of the second set of pixels can have a position corresponding to a position of a pixel of the first set of pixels. Referring to FIG. 5, pixels from regions 520a and 520b collectively make up second set of pixels 520 for second image 510. The position of each pixel in regions 520a and 520b corresponds to the position of a pixel in regions 515a and 515b of first image 505.

Test computing device 135 can compute a pixel luminance for each pixel of the second image as described above. Test computing device can further compute a luminance value for the second image based on the mean of the pixel luminance values calculated for the pixels in the second set of pixels. Test computing device 135 can then use substantially similar operations as described above to set the first performance parameter according to a difference between the luminance value computed based on the first set of pixels and the luminance value computed based on the second set of pixels.

Similarly, test computing device 135 can use the position information about the pixels of the first set of pixels to create a third set of pixels including pixels from the third image and a fourth set of pixels including pixels from the fourth image. For example, each pixel of the third set of pixels can have a position corresponding to a position of a pixel of the first set of pixels. Likewise, each pixel of the fourth set of pixels can have a position corresponding to a position of a pixel of the first set of pixels.

Referring to FIG. 6, pixels from regions 615a and 615b collectively make up third set of pixels 615 for third image 605. Accordingly, the luminance value computed for third image 605 is based on the mean of the pixel luminance values calculated for the pixels located within regions 615a and 615b. Further, pixels from regions 620a and 620b collectively make up fourth set of pixels 620 for fourth image 610. Accordingly, the luminance value computed for fourth image 610 is based on the mean of the pixel luminance values calculated for the pixels located within regions 620a and 620b. Test computing device 135 can use substantially similar operations as described above to set the second performance parameter based on a difference between the luminance computed based on the third set of pixels and the luminance computed based on the fourth set of pixels.

For this example, the position of each pixel in regions 615a and 615b, and regions 620a and 620b respectively correspond to the position of a pixel in regions 515a and 515b of first image 505 in FIG. 5. Accordingly, the method can substantially reduce the amount of storage required for storing the images extracted from the captured video since only a percentage of the pixels from each image are required for each computation. Further, the method can substantially reduce processing times for performing the operations described herein due to the reduced data set on which test computing device 135 operates.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for determining a performance metric of a mobile computing device application, the method comprising:
   capturing, by a test computing device, a plurality of images displayed on a mobile computing device based on execution of a mobile computing device application, wherein capturing the plurality of images comprises:
      capturing, by the test computing device, a video of a reflection of the mobile computing device on a reflective element for a predetermined period of time; and
      extracting, by the test computing device, the plurality of images from the captured video, the plurality of images showing the reflection of the mobile computing device display at predetermined intervals during the predetermined period of time;
   determining, by the test computing device, a first property of a first image of the plurality of images and a first property of a second image of the plurality of images;
   setting, by the test computing device, a first performance parameter based on a difference between the first property of the first image and the first property of the second image;
   determining, by the test computing device, a first property of a third image of the plurality of images and a first property of a fourth image of the plurality of images;
   setting, by the test computing device, a second performance parameter based on a difference between the first property of the third image and the first property of the fourth image; and
   determining, by the test computing device, a performance metric based on a difference between the first performance parameter and the second performance parameter.

2. The computerized method of claim 1 wherein determining the first property of the first image comprises computing a first luminance value based on a plurality of pixels of the first image, and determining the first property of the second image comprises computing a second luminance value based on a plurality of pixels of the second image.

3. The computerized method of claim 1 wherein setting the first performance parameter based on the difference between the first property of the first image and the first property of the second image comprises:
   determining, by the test computing device, the difference between the first property of the first image and the first property of the second image exceeds a first predetermined threshold; and
   setting, by the test computing device, the first performance parameter based on a time the first image was displayed on the mobile computing device.

4. The computerized method of claim 1 wherein determining the first property of the third image comprises computing a third luminance value based on a plurality of pixels of the third image, and determining the first property of the fourth image comprises computing a fourth luminance value based on a plurality of pixels of the fourth image.

5. The computerized method of claim 1 wherein setting the second performance parameter based on the difference between the first property of the third image and the first property of the fourth image comprises:
   determining, by the test computing device, the first property of the third image and the first property of the fourth image are substantially equal; and
   setting, by the test computing device, the second performance parameter based on a time the third image was displayed on the mobile computing device.

6. The computerized method of claim 1 wherein determining the first property of the first image and the first property of the second image comprises:
   computing, by the test computing device, a pixel luminance value for each pixel of the first image;
   creating, by the test computing device, a first set of pixels comprising pixels of the first image having a predetermined range of pixel luminance values, wherein the first set of pixels comprises a predetermined number of pixels of the first image;
   computing, by the test computing device, a first luminance value based on a mean of the pixel luminance values of the pixels of the first set of pixels;
   creating, by the test computing device, a second set of pixels comprising pixels of the second image, wherein each pixel of the second set of pixels has a position corresponding to a position of a pixel of the first set of pixels;
   computing, by the test computing device, a pixel luminance value for each pixel of the second set of pixels; and
   computing, by the test computing device, a second luminance value based on a mean of the pixel luminance values of the pixels of the second set of pixels.

7. The computerized method of claim 6 wherein determining the first property of the third image of the plurality of images and the first property of the fourth image of the plurality of images comprises:
   creating, by the test computing device, a third set of pixels comprising pixels of the third image, wherein each pixel of the third set of pixels has a position corresponding to a position of a pixel of the first set of pixels;
   computing, by the test computing device, a pixel luminance value for each pixel of the third set of pixels;
   computing, by the test computing device, a third luminance value based on a mean of the pixel luminance values of the pixels of the third set of pixels;
   creating, by the test computing device, a fourth set of pixels comprising pixels of the fourth image, wherein each pixel of the fourth set of pixels has a position corresponding to a position of a pixel of the first set of pixels;

computing, by the test computing device, a pixel luminance value for each pixel of the fourth set of pixels; and computing, by the test computing device, a fourth luminance value based on a mean of the pixel luminance values of the pixels of the fourth set of pixel.

8. The computerized method of claim 6 wherein the first set of pixels comprises between fifteen and thirty percent of a total number of pixels of the first image.

9. The computerized method of claim 6 wherein the pixel luminance for each pixel of the first image is based on a weighted sum of a plurality of pixel color component intensity values.

10. The computerized method of claim 1 wherein the third image and the fourth image are captured consecutively in time by the test computing device.

11. The computerized method of claim 1 wherein the plurality of images displayed on the mobile computing device comprises a video of an image displayed the mobile computing device changing from a first orientation to a second orientation during the first predetermined period of time.

12. The method of claim 11 wherein the plurality of images displayed on the mobile computing device are captured in response to a first command transmitted by the mobile computing device executing a test script received from a remote computing device, and wherein the mobile computing device changes from a first orientation to a second orientation based on a second command transmitted to a moveable support member coupled to the mobile computing device.

13. The computerized method of claim 1 wherein the plurality of images are extracted from the captured video at a rate of substantially sixty images per second.

14. The computerized method of claim 1 wherein the performance metric comprises a duration of time for an image displayed on the mobile computing device to change from the first orientation to the second orientation.

15. An automated test system for automated quality assurance testing of a mobile computing device application, the automated test system comprising:

a test computing device comprising a capture device;

a moveable support member in communication with the test computing device;

a mobile computing device having a display, the mobile computing device coupled to the moveable support member in a first orientation, the moveable support member being capable of rotating the mobile computing device between the first orientation and a second orientation; and a reflective element having a reflective surface in optical communication with the display of the mobile computing device and the capture device of the test computing device, wherein the test computing device is programmed to:

capture a plurality of images displayed on a mobile computing device based on execution of a mobile computing device application, wherein to capture the plurality of images the test computing device is further programmed to:

capture a video of a reflection of the mobile computing device on the reflective element for a predetermined period of time; and extract the plurality of images from the captured video, the plurality of images showing the reflection of the mobile computing device display at predetermined intervals during the predetermined period of time;

determine a first property of a first image of the plurality of images and a first property of a second image of the plurality of images;

set a first performance parameter based on a difference between the first property of the first image and the first property of the second image;

determine a first property of a third image of the plurality of images and a first property of a fourth image of the plurality of images;

set a second performance parameter based on a difference between the first property of the third image and the first property of the fourth image; and determine a performance metric based on a difference between the first performance parameter and the second performance parameter.

16. The automated test system of claim 15 wherein the test computing device is further programmed to:

compute a first luminance value based on a plurality of pixels of the first image; and compute a second luminance value based on a plurality of pixels of the second image.

17. The automated test system of claim 15 wherein the test computing device is further programmed to:

determine the difference between the first property of the first image and the first property of the second image exceeds a first predetermined threshold; and set the first performance parameter based on a time the first image was displayed on the mobile computing device.

18. The computerized method of claim 15 wherein the test computing device is further programmed to:

compute a third luminance value based on a plurality of pixels of the third image; and determine the first property of the fourth image comprises computing a fourth luminance value based on a plurality of pixels of the fourth image.

19. The automated test system of claim 15 wherein the test computing device is further programmed to:

determine the first property of the third image and the first property of the fourth image are substantially equal; and set the second performance parameter based on a time the third image was displayed on the mobile computing device.

20. The automated test system of claim 15 wherein the test computing device is further programmed to:

compute a pixel luminance value for each pixel of the first image;

determine a first set of pixels comprising pixels of the first image having a predetermined range of pixel luminance values, wherein the first set of pixels comprises a predetermined number of pixels of the first image;

compute a first luminance value based on a mean of the pixel luminance values of the pixels of the first set of pixels;

determine a second set of pixels comprising pixels of the second image, wherein each pixel of the second set of pixels has a position corresponding to a position of a pixel of the first set of pixels;

compute a pixel luminance value for each pixel of the second set of pixels; and compute a second luminance value based on a mean of the pixel luminance values of the pixels of the second set of pixels.

21. The automated test system of claim 20 wherein the test computing device is further programmed to:
   create a third set of pixels comprising pixels of the third image, wherein each pixel of the third set of pixels has a position corresponding to a position of a pixel of the first set of pixels;
   compute a pixel luminance value for each pixel of the third set of pixels;
   compute a third luminance value based on a mean of the pixel luminance values of the pixels of the third set of pixels;
   create a fourth set of pixels comprising pixels of the fourth image, wherein each pixel of the fourth set of pixels has a position corresponding to a position of a pixel of the first set of pixels;
   compute a pixel luminance value for each pixel of the fourth set of pixels; and
   compute a fourth luminance value based on a mean of the pixel luminance values of the pixels of the fourth set of pixel.

22. The automated test system of claim 20 wherein the first set of pixels comprises between fifteen and thirty percent of a total number of pixels of the first image.

23. The automated test system of claim 20 wherein the pixel luminance for each pixel of the first image comprises a luminance based on a weighted sum of a plurality of pixel color component intensity values.

24. The automated test system of claim 15 wherein the third image and the fourth images are captured consecutively in time by the test computing device.

25. The computerized method of claim 15 wherein the plurality of images displayed on the mobile computing device comprise a video of an image displayed the mobile computing device changing from the first orientation to the second orientation during the first predetermined period of time.

26. The automated test system of claim 25 further comprising a remote computing device, wherein the plurality of images displayed on the mobile computing device are captured in response to a first command transmitted by the mobile computing device executing a test script received from the remote computing device, and
   wherein the mobile computing device changes from a first orientation to a second orientation based on a second command transmitted to the moveable support.

27. The automated test system of claim 15 wherein the plurality of images are extracted from the captured video at a rate of substantially sixty images per second.

28. The automated test system of claim 15 wherein the performance metric comprises a duration of time for an image displayed on the mobile computing device to change from the first orientation to the second orientation.

* * * * *